US012394175B2

(12) United States Patent
Capellier

(10) Patent No.: US 12,394,175 B2
(45) Date of Patent: Aug. 19, 2025

(54) VISIBILITY DETERMINATIONS IN PHYSICAL SPACE USING EVIDENTIAL ILLUMINATION VALUES

(71) Applicant: Motional AD LLC, Boston, MA (US)

(72) Inventor: Edouard Francois Marc Capellier, Singapore (SG)

(73) Assignee: Motional AD LLC, Boston, MA (US)

( * ) Notice: Subject to any disclaimer, the term of this patent is extended or adjusted under 35 U.S.C. 154(b) by 364 days.

(21) Appl. No.: 17/817,954

(22) Filed: Aug. 5, 2022

(65) Prior Publication Data
US 2024/0046605 A1 Feb. 8, 2024

(51) Int. Cl.
*G06V 10/60* (2022.01)
*G01S 17/86* (2020.01)
*G01S 17/89* (2020.01)
*G06V 10/28* (2022.01)
*G06V 10/82* (2022.01)
*G06V 10/98* (2022.01)
*G06V 20/56* (2022.01)

(52) U.S. Cl.
CPC .............. *G06V 10/60* (2022.01); *G01S 17/86* (2020.01); *G01S 17/89* (2013.01); *G06V 10/28* (2022.01); *G06V 10/82* (2022.01); *G06V 10/993* (2022.01); *G06V 20/56* (2022.01)

(58) Field of Classification Search
None
See application file for complete search history.

(56) References Cited

U.S. PATENT DOCUMENTS

| 2013/0083971 A1* | 4/2013 | Du ........................ G06V 20/584 |
| | | 382/104 |
| 2017/0061593 A1 | 3/2017 | Alahmar |
| 2019/0295318 A1* | 9/2019 | Levinson ............... G06N 20/00 |

(Continued)

FOREIGN PATENT DOCUMENTS

CN 106846282 A * 6/2017

OTHER PUBLICATIONS

Agarwal, Improving Illumination in Night Time Images, LearnOpenCV, https://learnopencv.com/improving-illumination-in-night-time-images/#viewSource, Mar. 15, 2021, 17 pages.

(Continued)

*Primary Examiner* — Chan S Park
*Assistant Examiner* — Promotto Tajrian Islam
(74) *Attorney, Agent, or Firm* — Knobbe, Martens, Olson & Bear, LLP

(57) ABSTRACT

Systems and methods are disclosed for identifying visibility of a physical space using visibility values and indications of uncertainty associated with the visibility values. One method can include capturing an image of a physical space, dividing pixels of the image into presumably well-lit and presumably not well-lit categories based on an intensity threshold, generating an evidential illumination map for the image based at least partly on a comparison between a value of each pixel to the intensity threshold, and projecting the evidential illumination map onto data representing a three-dimensional scan of the physical space. Evidential values can enable an autonomous vehicle to more safely navigate spaces using camera data by enabling programmatic determination of uncertainty for the camera data.

14 Claims, 7 Drawing Sheets

(56) References Cited

U.S. PATENT DOCUMENTS

2021/0150748 A1* 5/2021 Ciurea ................. H04N 13/128
2024/0233347 A1* 7/2024 Ba ........................ G06T 7/0012

OTHER PUBLICATIONS

Feng et al., Learning a Convolutional Autoencoder for Nighttime Image Dehazing, https://www.mdpi.com/2078-2489/11/9/424, Published: Aug. 31, 2020, 13 pages.

H. Zhang, V. Sindagi and V. M. Patel, Joint Transmission Map Estimation and Dehazing Using Deep Networks, in IEEE Transactions on Circuits and Systems for Video Technology, vol. 30, No. 7, pp. 1975-1986, Jul. 2020, doi: 10.1109/TCSVT.2019.2912145.

Shi et al., Nighttime low illumination image enhancement with single image using bright/dark channel prior, EURASIP Journal on Image and Video Processing vol. 2018, Article No. 13 (2018).

Dempster-Shafer theory, Wikipedia, https://en.wikipedia.org/wiki/Dempster%E2%80%93Shafer_theory, [retrieved Aug. 5, 2022], 11 pages.

Otsu's method, Wikipedia, https://en.wikipedia.org/wiki/Otsu%27s_method, [retrieved Aug. 5, 2022], 9 pages.

Qin et al., Image-Based Dedicated Methods of Night Traffic Visibility Estimation, https://www.mdpi.com/2076-3417/10/2/440, Published: Jan. 7, 2020, 16 pages.

Yang et al., Image-Based Visibility Estimation Algorithm for Intelligent Transportation Systems, IEEE Access, vol. 6, Dec. 27, 2018, 13 pages.

Great Britain Office Action issued for Application No. GB 2219392.4, dated Jun. 29, 2023.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

\* cited by examiner

VISIBILITY DETERMINATIONS IN PHYSICAL SPACE USING EVIDENTIAL ILLUMINATION VALUES

DETAILED DESCRIPTION

Figure 1:
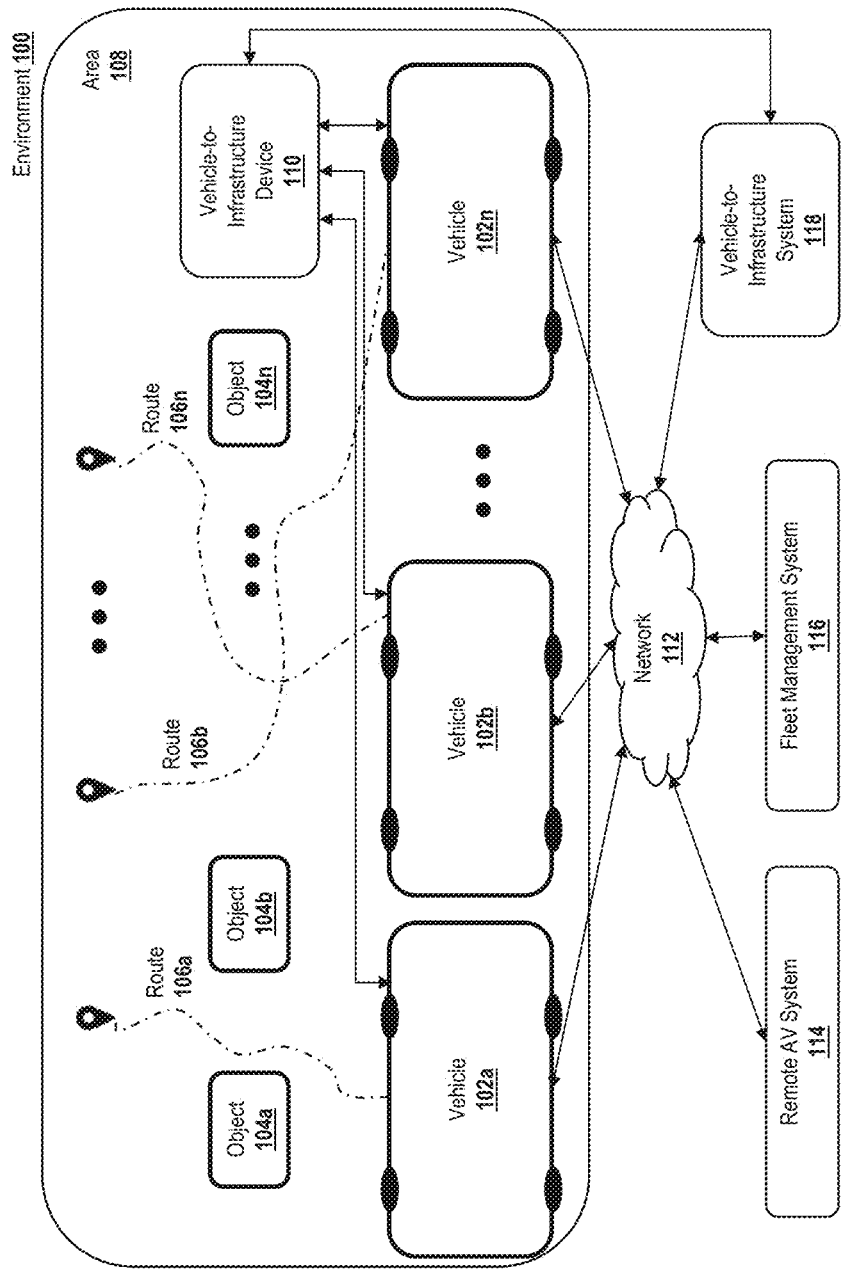
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

Generally described, aspects of the present disclosure relate to identifying visibility of a physical space based on an evidential illumination assessment of the physical space generated from camera images of the physical space. Moreover, embodiments of the present disclosure relate to controlling operation of an autonomous vehicle based on identified visibility of the physical space, to ensure safe and efficient operation of such a vehicle. Generally described, an evidential illumination assessment as described herein may be generated based on processing of a camera image of the physical space, and indicate, for regions within the image, a degree of uncertainty as to whether the region is well-lit. As will be appreciated by one skilled in the art, accurate assessment of location visibility may be critical to a number of functions of a self-driving vehicle, particularly safe navigation in low visibility driving scenarios, such as nighttime and hazy conditions. Thus, it may be highly desirable to provide a visibility grid in a variety of contexts.

There is a multitude of ways (e.g., the use of different sensors and cameras, including but not limited to LiDAR, radar, cameras, photoresistors, laser range finders, and the like) for computer systems embedded in self-driving vehicles to detect various objects, obstacles, and areas around the vehicle. Computer systems may utilize and combine these different mechanisms to create processes that comprehend the sensor data and make mechanical decisions as a result. Challenges arise in low visibility situations. While figuring out what can or cannot be seen with a camera may be intuitively obvious to humans, it is not intuitively obvious to computer systems. For example, typical self-driving vehicles equipped with cameras may not include computer systems capable of clearly discerning whether objects/obstacles are visible (i.e., sufficiently illuminated) or not and to what degree. Illustratively, it may be computationally difficult to distinguish between clearly visible dark colored objects (such as a black car) and unlit areas that may contain obstacles, safety hazards, or the like. Accordingly, typical solutions may lack the ability to assess the degree of uncertainty of illuminated objects, obstacles, and areas.

Embodiments of the present disclosure address the previously mentioned deficiencies of typical low visibility driving scenarios for self-driving vehicles through generation and use of a visibility grid generated from an evidential visibility assessment. More specifically, embodiments as described herein may utilize camera images to determine both whether a particular region is well lit, and an uncertainty of that determination. These values may then be projected into a physical space to enable a vehicle to safely and effectively navigate that space.

As discussed herein, an evidential visibility assessment may be programmatically generated by processing a camera image of an area. Such processing can include converting an image to a greyscale representation. For example, a color image, such as an image in the RGB color space, may first be converted to a greyscale image. In one embodiment, the greyscale image is generated by converting the image from a current color space to the lab color space, and utilizing the lightness (I) values of that converted image as the greyscale image. In another embodiment, the greyscale image is created as a transmittance map, as discussed in more detail below. A threshold intensity value can then be determined to separate presumably well-lit pixels from presumably not-well-lit pixels in the image. Illustratively, Ostu's method is applied to the greyscale image to generate an intensity threshold. Thereafter, an evidential assessment of each pixel can be made by determining how close a value of the pixel in the greyscale image is to the intensity threshold. Those pixels very close or at the threshold can be assigned a high or total uncertainty value , as there is a strong uncertainty as to whether the pixels depict a visible object or instead a lack of visibility at that point. As pixels deviate from the threshold, the uncertainty value can be decreased. These uncertainty values can then be combined into an evidential visibility assessment for the area depicted in the image, indicating whether any given portion of the image is determined to be visible, and the uncertainty surrounding that determination.

After obtaining an evidential visibility assessment for the area depicted in the image, an autonomous vehicle (or other device) can project the assessment onto a physical space captured within the image. For example, the vehicle may capture data representing a three dimensional scan of the area, and project the visibility values and corresponding uncertainty values onto the physical space. This projection can in turn enable safer and more efficient navigation of the area by the vehicle, as the vehicle can programmatically determine a degree of uncertainty (and thus risk) associated with reliance on image data regarding a given region.

The foregoing aspects and many of the attendant advantages of this disclosure will become more readily appreciated as the same become better understood by reference to the following description, when taken in conjunction with the accompanying drawings.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
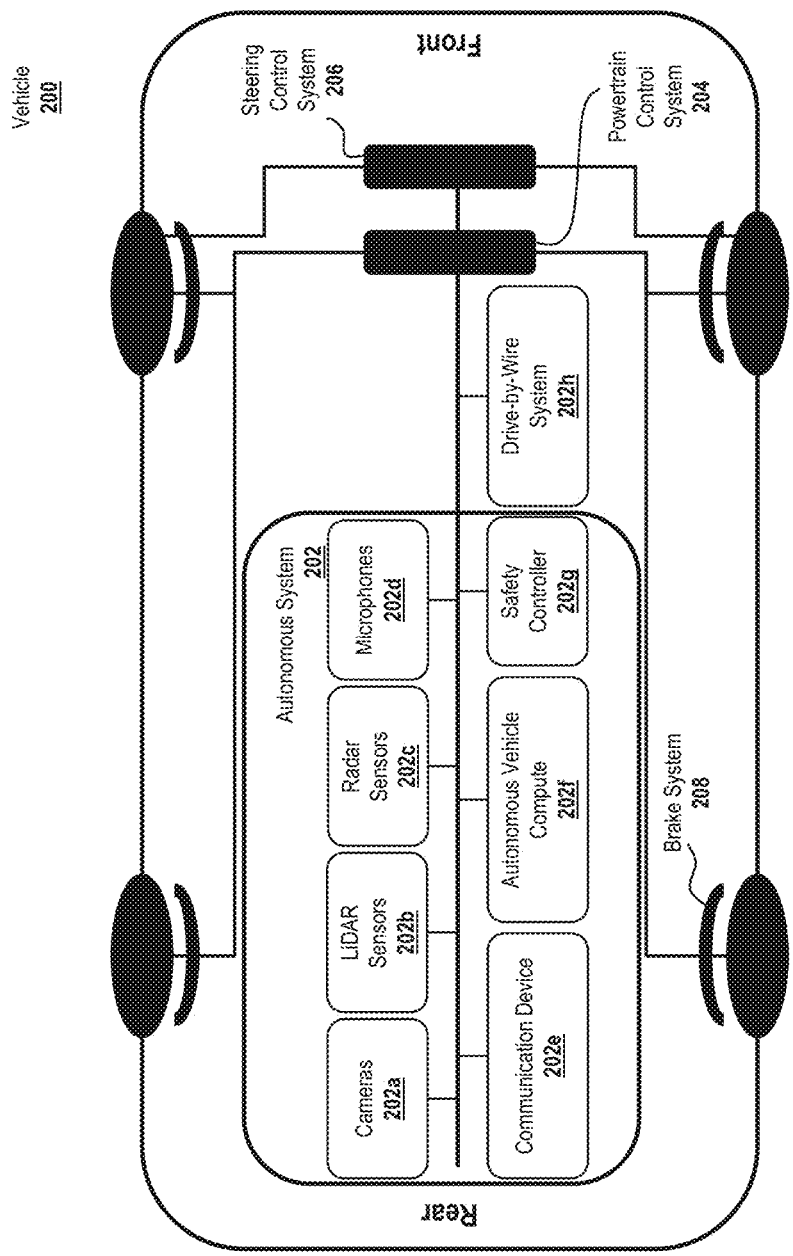
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
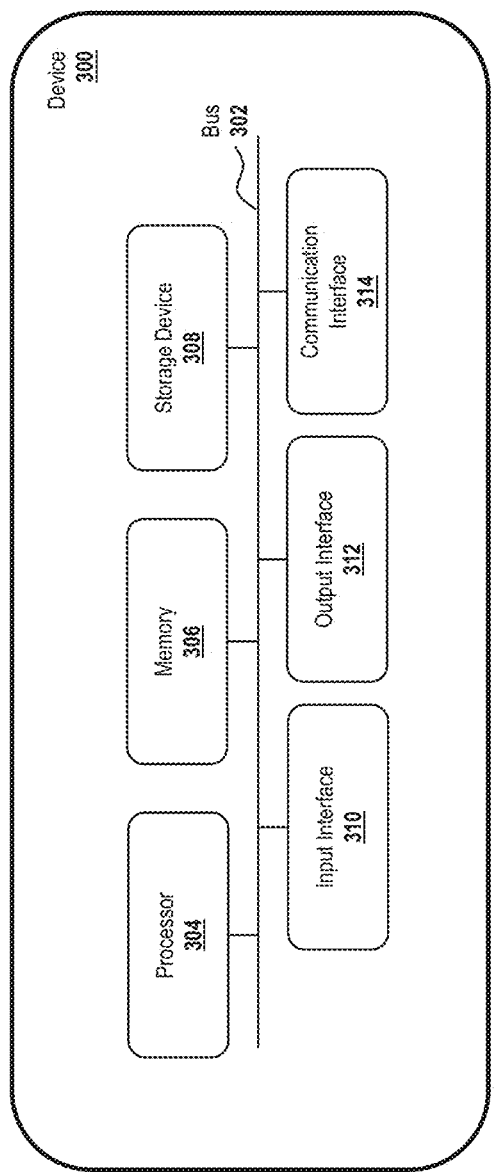
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
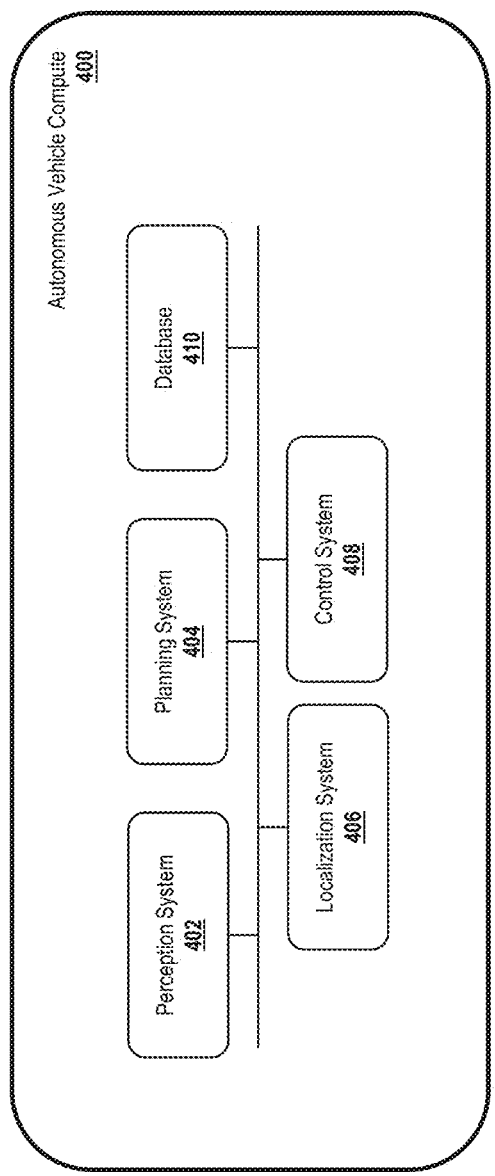
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Evidential Illumination Grid Generation

As discussed above, it can be important for safe and effective operation of autonomous vehicles that such vehicles can programmatically assess their surroundings. One commonly used mechanism for gathering data regarding such surroundings is capturing camera images. However, a drawback of camera images is that it is typically difficult to programmatically distinguish those portions of the image that are sufficiently lit to capture an environment and those that are not. Embodiments of the present disclosure therefore relate to generation of evidential illumination assessments from camera images, indicating determinations of whether portions of an image are sufficiently lit, and uncertainty associated with these determinations. As disclosed herein, an evidential illumination assessment generated from a camera image can then be projected into a physical environment, such as by projecting the evidential illumination assessment onto a 3D representation of the environment generated from a depth-sensing scan (e.g., a lidar scan). The resulting evidential visibility grid can then be used to facilitate safe and effective operation of an autonomous vehicle.

Figure 5:
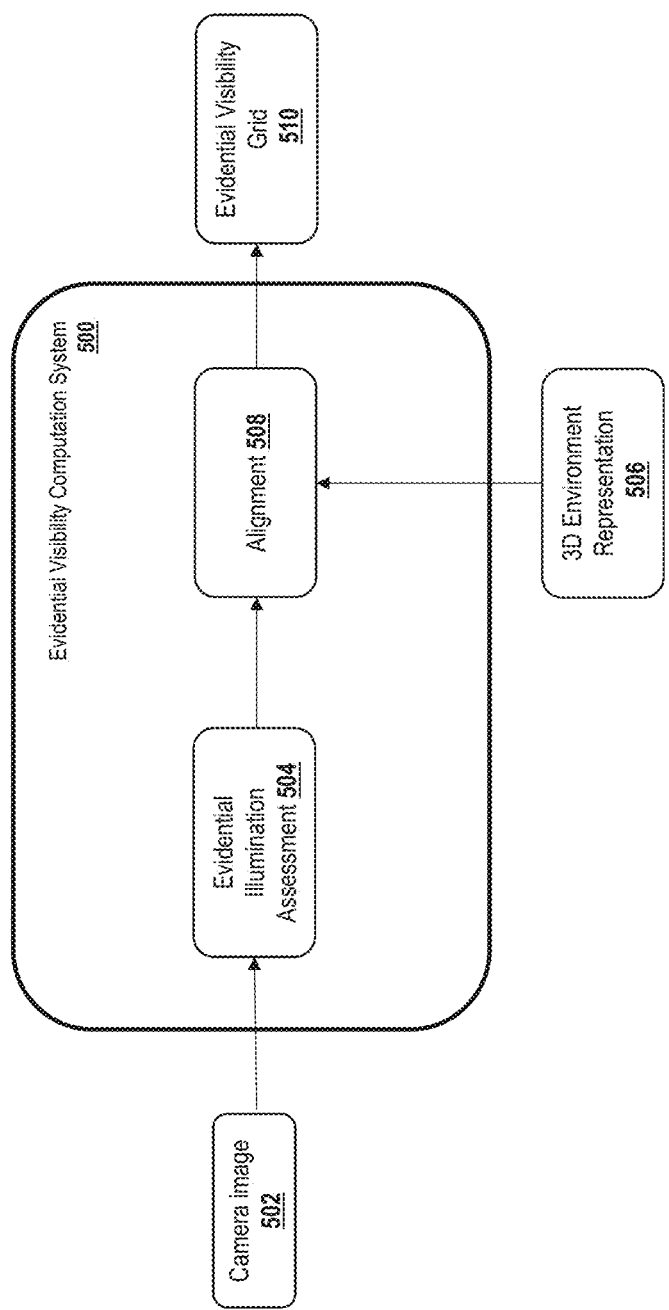
FIG. 5 is a block diagram illustrating example operation of an evidential visibility computation system to generate an evidential visibility grid for a physical space using data representing a three dimensional scan of the space and an evidential illumination assessment generated from a camera image of the space.

Specifically, FIG. 5 is a block diagram illustrating example operation of an evidential visibility computation system to generate an evidential visibility grid for a physical space using data representing a three dimensional scan of the space and an evidential illumination assessment generated from a camera image of the space. The evidential visibility computational system may be implemented for example by a device 300 of FIG. 3. The device 300 can illustratively be installed within a vehicle 200 of FIG. 2, or may be external to such a vehicle 200 (e.g., in communication with such a vehicle 200 via a network).

As shown in FIG. 5, the evidential visibility computation system 500 obtains as input a camera image 502 depicting an environment. Illustratively, the camera image 502 may be obtained by operation of a camera mounted on the vehicle. The camera may have a known field of view (e.g., relative to other sensors on the vehicle) to facilitate projection of images captured by the camera onto representations of other sensors. For example, the camera may have a known field of view represented as a horizontal range and vertical range with respect to a 3D coordinate system around the vehicle.

In FIG. 5, the evidential visibility computation system 500 processes the image 502 to generate an evidential illumination assessment 504 of the image 502.

In one embodiment, the system 500 first converts the image 502 into a greyscale image to facilitate further processing. For example, where the image is a color image in the RGB color space, the image may be converted into the lab color space, and the lightness (I) values of that converted image may be used as the greyscale image.

In another embodiment, the system 500 generates a transmittance map from the image, which attempts to estimate the amount of light that is not scattered by an object and reaches the camera lens, and utilizes the transmittance map as a greyscale input. One mechanism for generating a transmittance map is disclosed in "Nighttime low illumination image enhancement with single image using bright/dark channel prior" by Shi et al., EURASIP Journal on Image and Video Processing volume 2018, Article number 13 (2018) ("Shi"). For example, Shi describes (e.g., at Section 4.3) how both bright and dark channels of an image (representing the maximum and minimum intensity of pixels, respectively, in a local patch) can be used to generate a transmittance map. As another mechanism, a transmission map may be generated from a bright channel of an RGB image, where the bright channel is defined as:

$$I^{bright}(x) = \max_{c \in \{r,g,b\}} \max_{y \in W(x)}(I^c(y)) \quad (1)$$

where:
x is a given pixel in the image;
$I^c$ is a color channel of I;
r, g, and b, are the respective RGB values of the pixel
W(x) is a window centered around the x pixel, with a tunable window size (e.g., of width and height 9, 11, 13, etc.).

The transmittance map can then be computed as $$t^{bright}(x) = \frac{I^{bright}(x) - A^c}{255 - A^c} \quad (2)$$

where $A^c$ is the maximum value among component values for atmospheric light, A, in the image, which may for example be calculated as an average of r, g, and b values for a top 10% of brightest pixels in the image (e.g., according to the bright values of the pixels). In some embodiments, the transmittance map may be further adjusted. For example, to account for potential presence of light sources in an image, the values of a transmittance map at specific ranges may be interpolated. The specific interpolation can be determined empirically; however, in one embodiment eight bit values from 32-255 are interpolated into the 32-100 range, while values from 0-32 are unmodified, to result in a transmittance map with values in a range of 0-100.

Additional or alternative mechanism may also be used to generate a transmittance map. For example, a machine learning model (such as a deep neural network) may be utilized to generate a transmittance map. Illustratively, a machine learning model may be trained based on a training data set that includes both input images and corresponding transmission maps to result in a trained model that takes an input an input image and provides as output a correspondence transmission map. In one embodiment, the machine learning model is a Generative Adversarial Network (GAN) that includes two sub-networks: a generator to generate transmission maps and a discriminator to discriminate between ML-generated maps and an actual transmission map corresponding to an input used to generate the ML-generated maps. One example implementation for use of a machine learning model to generate transmittance maps is disclosed in H. Zhang, V. Sindagi and V. M. Patel, "Joint Transmission Map Estimation and Dehazing Using Deep Networks," in IEEE Transactions on Circuits and Systems for Video Technology, vol. 30, no. 7, pp. 1975-1986, July 2020, doi: 10.1109/TCSVT.2019.2912145.

Once a greyscale image (e.g., corresponding to I values in the lab color space, a transmittance map, etc.) is obtained, the system 500 can calculate an uncertainty value for each pixel in the image, corresponding to an uncertainty regarding whether the pixel is well lit. To facilitate calculation of uncertainty values, the system 500 can first calculate an intensity threshold distinguishing presumably well-lit pixels from presumably not-well-lit pixels. In one embodiment, the threshold is calculated according to an automatic thresholding algorithm, such as Otsu's method. Thereafter, the system 500 can calculate an uncertainty value for each pixel by comparing a value of the pixel in greyscale representation to the intensity threshold. For example, pixels with values in the greyscale representation that are near or at the threshold can be labeled with a high uncertainty value, while pixels with values farther from the threshold are labeled with lower uncertainty values. In one embodiment, the values are calculated as:

$$U = N^{\frac{-|I-O_{threshold}|}{\lambda * std_{b/f}}} \quad (3)$$

where:
U is the uncertainty value of a pixel;
N and $\lambda$ are tunable parameters (e.g., 2 and 0.5, respectively);
I is the value for the pixel in the greyscale image;
$O_{threshold}$ is the intensity threshold; and
$std_{b/f}$ is the standard deviation of values below or above the threshold, respectively (e.g., with $std_b$, the standard deviation of values below the threshold, used for pixels below the threshold and $std_f$, the standard deviation of values above the threshold, used for pixels above the threshold).

The resulting matrix of uncertainty values can thereafter be used as all or part of the evidential illumination assessment 504, indicating an uncertainty of whether each pixel in the camera image 502.

In addition, from the matrix of uncertainty values, evidential matrices can be generated to indicate both evidence of being well lit and evidence of being not well lit. For example, the evidence of a pixel being well lit may be set to 0 for any pixel not satisfying the intensity threshold, and to a value of 1 minus U for each pixel satisfying the intensity threshold. Similarly, the evidence of a pixel being not well lit may be set to 0 for any pixel satisfying the intensity threshold, and to a value of 1 minus U for each pixel not satisfying the intensity threshold. Thus, the evidential illumination assessment 504 can further generate evidential maps for determinations of being well lit, determinations of not being well lit, or both.

The evidential values generated according to present embodiments can illustratively represent degrees of belief according to Dempster-Shafer theory, also known as the theory of belief functions. Accordingly, these mathematical representations of uncertainty can be manipulated and reasoned on according to functions of Dempster-Shafer theory. For example, in some embodiments multiple grids of a given area (e.g., generated based on distinct images of the area) may be combined according to Dempster's rule of combination.

After generating an evidential illumination assessment 504, the system 500 can project the assessment into a physical space, thus enabling the system 500 to accurately determine the visibility of points within that space and corresponding uncertainty of that visibility. To facilitate projection, the system 500 can obtain a 3D environment representation 506, corresponding to data representing an environment depicted within the camera image 502. For example, the 3D environment representation 506 may be a point cloud generated from a scan of the area with a lidar sensor or other depth-sensing sensor. The camera used to produce the camera image 502 and the sensor used to capture data corresponding to the 3D environment representation may have a known correspondence based on prior calibration of these sensors. For example, data produced by the sensor used to capture data corresponding to the 3D environment representation may be represented as a coordinate system, and the field of view of the camera producing the camera image 502 may have a known range in that coordinate system (e.g., as a known point, horizontal angle, and vertical angle). Accordingly, system 500 can implement alignment 508 to project the pixels, as represented in the evidential illumination assessment 504, onto the 3D environment representation 506. As a result of such alignment 508, the system 500 provides an evidential visibility grid 510, which provides evidential values as to whether points within the 3D environment representation 506 are well lit. In one embodiment, the uncertainty values are projected onto the 3D environment representation 506 to produce the grid 510. In another embodiment, one or more of the evidential maps for determinations of being well lit or determinations of not being well lit are projected onto the 3D environment representation 506 to produce the grid 510. In yet other embodiments, multiple grids 510 are produced, each representing a projection of one of a map of uncertainty values, a map for determinations of being well lit, or a map of determinations of not being well lit.

Figure 6:
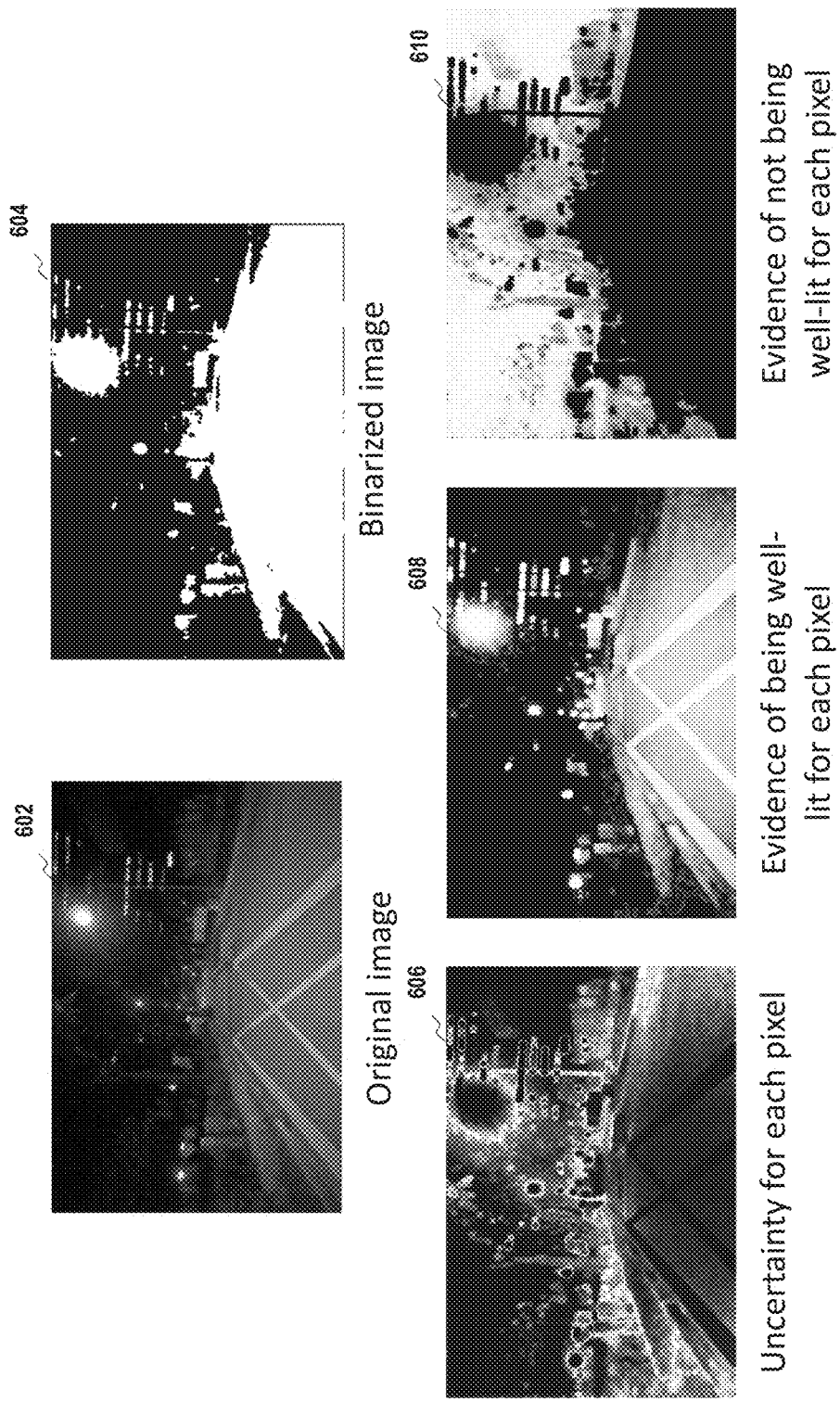
FIG. 6 shows example images generated by the evidential visibility computation system during the example operations of FIGS. 5.

To further illustrate the operations of FIG. 5, FIG. 6 shows example images generated by the evidential visibility computation system 500 during the example operations of FIG. 5. Specifically, image 602 is an example camera image 502. As can be seen in FIG. 6, the image 602 is a color image capturing a roadway at night. Embodiments of the present disclosure may be particularly suited to low-light operation, such as operation at night or during hazy conditions, as these conditions can prove difficult to navigate safely, particularly based on camera data.

As discussed above, generation of an evidential illumination assessment can be based at least partly on an intensity threshold calculated from a greyscale representation of the image. For example, the greyscale representation may be lightness values from a representation of the image in the lab color space. As another example, the greyscale representation may be values of a transmittance map for the image. In FIG. 6, the intensity threshold is visualized as a binarized image 604, resulting from application of an intensity threshold to the original image 602. Specifically, in FIG. 6, the binarized image 604 results from application of Otsu's method to the image 602 to result in a threshold, setting as positive all pixels of the image 602 that satisfy the threshold, and setting as negative all remaining pixels. As can be seen in FIG. 6, brighter parts of the image 602 are generally set to positive values in the binarized image 604, while darker parts of the image 602 are generally set to negative. However, the binarized image 604 does not provide an indication of uncertainty with respect to individual pixels—that is, pixels corresponding to the streetlamp, which are undoubtably well lit, are equated in the binarized image 604 with pixels at the periphery to the lamp's illumination, which are more questionably lit.

To quantize this uncertainty, an evidential visibility computation system 500 can apply the processes noted above to the image 602, based on the threshold visualized in the binarized image 604, to produce evidential illumination assessments 606-610. Specifically, the evidential visibility computation system 500 can calculate an uncertainty value for each pixel in the image 602 by comparing the value of the greyscale representation of the image 602 (e.g., a transmittance map, lightness values, etc.) to the intensity threshold. In one embodiment, the system 500 calculates the uncertainty value according to equation (3), above. As a result, the system 500 generates image 606, which depicts uncertainty values for the image 602, reflecting uncertainty as to whether individual pixels are (or are not) well lit. As can be seen in FIG. 6, the pixels directly depicting the streetlamp are dark within image 606, indicating low uncertainty (high certainty) that the pixels are well lit. Similarly, the pixels depicting the dark sky are dark within image 606, indicating low uncertainty (high certainty) that the pixels are not well lit. However, pixels between these two points—such as at the periphery of the streetlamp—are shown as light within image 606. This indicates that there is substantial uncertainty as to whether these pixels are well lit.

In addition to an uncertainty matrix such as image 606, the evidential visibility computation system 500 may utilize uncertainty values for pixels of the image to generate both well-lit and not-well-lit evidential matrices, depicted as images 608 and 610 in FIG. 6. Specifically, image 608 depicts an image in which pixel values are set to 0 for any pixel not satisfying the intensity threshold, and to a value of 1 minus U for each pixel satisfying the intensity threshold. Thus, image 608 visualizes a weight of evidence that an individual pixel within the image 602 is well lit. Conversely, image 610 depicts an image in which pixel values are set to 0 for any pixel satisfying the intensity threshold, and to a value of 1 minus U for each pixel not satisfying the intensity threshold. Thus, image 610 visualizes a weight of evidence that an individual pixel within the image 602 is not well lit. Matrixes corresponding to images 606-610, which may individually or collectively be considered evidential illumination assessments, may then be utilized to generate an evidential illumination grid for a physical area, as described above.

Figure 7:
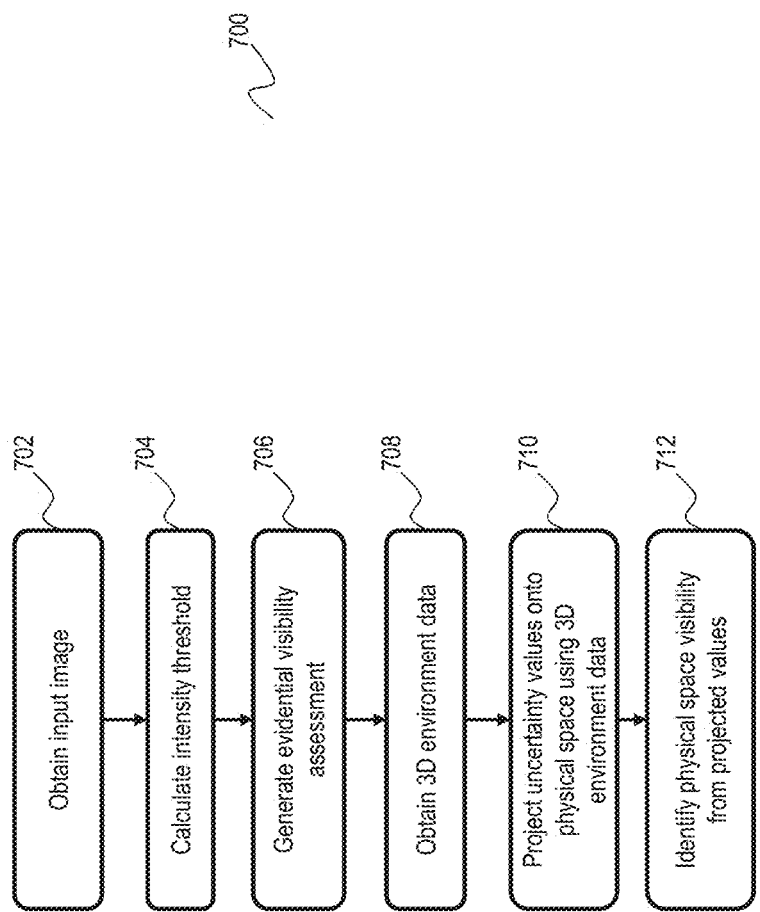
FIG. 7 is a flowchart depicting an example process for identifying visibility of locations in physical space based on an evidential illumination assessment.

With reference to FIG. 7, an illustrative routine 700 will be described for identifying visibility of locations in physical space based on an evidential illumination assessment. The routine 700 can be implemented, for example, by the evidential visibility computation system 500 of FIG. 5.

The routine 700 begins at block 702, where the evidential visibility computation system 500 obtains an input image. The input image illustratively corresponds to data generated by a camera capturing information regarding a physical space, such as a physical space surrounding an autonomous vehicle. The physical space may include uneven lighting, e.g. by virtue of the space being an open-air area at night time, containing haze, fog, or the like. Accordingly, it may be difficult to programmatically distinguish well-lit from not well-lit areas in the image. For example, it may be difficult to programmatically distinguish well-lit black pavement from not well-lit black pavement, as both might appear substantially similar within an image. Accordingly, the routine 700 may be used to generate evidentiary values for the image, indicating uncertainty regarding whether each portion of the image is well-lit. Moreover, these values may be projected into a representation of the physical space, such as a representation generated based on a three-dimensional scan of the physical space, to facilitate safe navigation of the space.

Accordingly, at block 704, the evidential visibility computation system 500 calculates an intensity threshold for the image, distinguishing presumably well-lit areas in the image from presumably not-well lit areas. To facilitate calculation of the intensity threshold, the evidential visibility computation system 500 can convert the image to greyscale. In one embodiment, conversion to greyscale includes converting the image from a current color space (e.g., the RGB color space) into the lab color space (also referred to as the CIELAB color space or the L*a*b color space), and utilizing the I values of the color space (representing perceptual lightness) as the greyscale image. In another embodiment, conversion to greyscale includes generation of a transmittance map for the image. As discussed above, a transmittance map may be generated in a variety of ways. For example, a transmittance map may be generated via equation 2, above, utilizing a bright channel calculated for an image. As another example, a transmittance map may be generated based on a dark channel of an image, independently or in combination with a bright channel. As yet another example, a transmittance map may be generated via a machine learning model, such as via a deep neural network.

Thereafter, the intensity threshold for the image (e.g., as converted to greyscale) can be calculated based on an automatic thresholding algorithm. One example of such an algorithm is Otsu's method; however, other automatic thresholding algorithms may be used.

As discussed above, the intensity threshold illustratively divides an image into presumably well-lit and presumably not well-lit portions, such that pixels with relevant values satisfying the threshold are presumably well-lit, and pixels with values not satisfying the threshold are presumably not well-lit. However, this binary determination does not provide a mathematical representation of the certainty of this determination. To provide such a representation, the evidential visibility computation system 500, at block 706, generates an evidential visibility assessment for the image. Generally described, the assessment can assign uncertainty values to individual portions (e.g., pixels) of the image, representing overall uncertainty for classifying the portion as well-lit or not well-lit, certainty for classification the portion as well-lit, or certainty for classification of the portion as not well-lit. Illustrative visualizations of these values are respectively shown as images 606, 608, and 610 of FIG. 6. In some instances, the evidential visibility computation system 500 may generate multiple uncertainty values for each pixel (e.g., the values of the pixel in each of images 606, 608, and 610). In one embodiment, the overall uncertainty for a pixel is calculated based on a difference between the value of the pixel and the intensity threshold. Moreover, the overall uncertainty value for a pixel may be based on a standard deviation of pixel values within the image, such as a standard deviation of values that are presumably well-lit, a standard deviation of values that are presumably not well-lit, or a standard deviation of all pixel values. Illustratively, the overall uncertainty value is calculated according to equation 3, above. Thereafter, values certainty for classification the portion as well-lit and certainty for classification of the portion as not well-lit can be calculated from the overall uncertainty values. For example, the certainty values for a pixel being well lit may be set to 0 for any pixel not satisfying the intensity threshold, and to a value of 1 minus U for each pixel satisfying the intensity threshold. Similarly, the certainty values for a pixel being not well lit may be set to 0 for any pixel satisfying the intensity threshold, and to a value of 1 minus U for each pixel not satisfying the intensity threshold. As used herein, the term "uncertainty value" is used broadly to encompass certainty values, as these to values are mathematical compliments. Accordingly, calculation of certainty values should be understood to be a calculation of uncertainty. Each set of uncertainty values can collectively be referred to herein as an evidential visibility assessment, indicating uncertainty regarding whether individual portions of the image are (or are not) well-lit.

At block 708, the evidential visibility computation system 500 obtains three-dimensional data regarding a physical space depicted in the input image. The three-dimensional data is illustratively representative of data captured during a depth-perceiving scan, such as via lidar scan of the area. For example, the three-dimensional data may be captured via operation of a lidar sensor on an autonomous vehicle that also includes a camera, which camera captured the input image. In FIG. 7, the input image and the 3D data have a known correspondence, which may have been generated for example during a prior calibration of the sensors capturing the respective data. For example, the camera capturing the input image may have a known field of view represented as a horizontal range and vertical range with respect to a 3D coordinate system around the vehicle, and the 3D data may be captured with respect to that coordinate system.

Accordingly, at block 710, the evidential visibility computation system 500 projects the uncertainty values in the evidential visibility assessment onto the physical space as represented in the 3D environment data. Illustratively, the 3D environment data may indicate a detected surface (e.g., a roadway), and projection can include projecting uncertainty values from the evidential visibility assessment onto the detected surface. In one embodiment, the evidential visibility computation system 500 divides the surface into a grid (e.g., a two-dimensional grid of X and Y values, with each position also including a height value indicating the surface detected in the physical space), and associates individual portions of the grid with values from the evidential visibility assessment. The values may be, for example, overall uncertainty values, values indicating a certainty that the portion is well lit, values indicating a certainty that the portion is not well lit, or a combination thereof.

Thereafter, at block 712, the evidential visibility computation system 500 can identify visibility in the physical space from the projected values. For example, where the evidential visibility computation system 500 is included within an autonomous vehicle, the vehicle may make decisions regarding navigation of the physical space based on the projected certainty values. Illustratively, the vehicle may elect to move more slowly into spaces with high uncertainty values (given the possibility that the space includes unilluminated obstacles) than into spaces with lower uncertainty values. As another example, where the vehicle includes illumination devices, the vehicle may elect to point such devices at spaces with higher uncertainty values. For example, the vehicle may move its headlights or other lighting to illuminate spaces with high uncertainty values. The vehicle may then capture a second image of the area and generate new uncertainty values for the area, such as via another implementation of the routine 700. In some embodiments, the projected uncertainty values may be passed to various components of an autonomous vehicle for use in functionality associated with those components. For example, the projected uncertainty values may be passed to a planning system, such as the planning system 404 of FIG. 4 for use in planning operation of an autonomous vehicle. In some embodiments, projected uncertainty values may be combined or used to annotate other data items. For example, the projected uncertainty values may be used to annotate, or fused with, occupancy or occlusion maps, such that the planning system 404 can take the illumination uncertainty or evidential values into account when utilizing such maps. Such fusion or annotation may be particularly suitable when occupancy or occlusion maps are generated by image-based sensors, such as cameras. As an illustration, if a camera-generated occupancy map indicates that a particular area is not occupied, but projected uncertainty values indicate that the location is in an uncertain or not-well-lit state, a planning system may discount or disregard the occupancy map's values for the area. In some instances, projected uncertainty values and other values within a map may be combined according to mathematical evidentiary combination rules, such as Dempster's or Jaeger's rule of combination. While examples are provided herein with reference to occupancy or occlusion maps, projected uncertainty values may be applied to any variety of maps. For example, a road grid map that indicates locations of roadways may be augmented with projected uncertainty values, enabling an autonomous vehicle to determine uncertainty levels with the state of certain roadways (e.g., a certainty of whether a particular roadway is clear of obstacles, if none are detected and the roadway is considered to be well-lit).

Still further, in some instances uncertainty values may be used to control combination of data from multiple sensors. As an example, a given set of data (e.g., an occupancy map, location data, etc.) may be generated from a combination of data from multiple sensors. Where at least some such sensors are image-based and reliant on illumination, uncertainty values may be used to control how this sensor data is combined with other sensor data. For example, when combining camera data and lidar data, camera data may be discounted or disregarded when the uncertainty for the data is high, or when strong evidence exists that the data depicts a not-well-lit area. In some embodiments, camera data and other data may be fused according to uncertainty values for the camera data. For example, the weight of camera data during fusion may be adjusted according to an uncertainty value (e.g., with a zero uncertainty resulting in full weight, and one hundred percent uncertainty resulting in zero weight). Accordingly, the uncertainty values can provide for more accurate combination of information from multiple sensors.

Accordingly, implementation of the routine 700 can facilitate safter more effective operation of autonomous vehicles by enabling programmatic handling of uncertainty with respect to images of a physical space.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A computer-implemented method, as implemented by one or more processors, comprising:
   receiving, by the one or more processors, first data corresponding to an image of a physical space captured by a camera;
   calculating, by the one or more processors, an intensity threshold for the first data distinguishing well-lit pixels within the first data from not-well-lit pixels within the first data, wherein calculating the intensity threshold for the first data comprises converting the first data to greyscale, and wherein converting the first data to greyscale comprises generating a transmittance map for the first data;
   generating, by the one or more processors, an evidential illumination map for the image based at least partly on a comparison between a value of each pixel in first data to an intensity threshold, wherein the evidential illumination map indicates an uncertainty that one or more pixels of the image depict a well-lit area;
   obtaining, by the one or more processors, second data corresponding to a three-dimensional representation of the physical space;
   using the second data, projecting, by the one or more processors, the evidential illumination map onto the physical space; and
   identifying, by the one or more processors, a visibility of one or more positions in the physical space based on projection of the evidential illumination map onto the physical space.

2. The computer-implemented method of claim 1, wherein projecting the evidential illumination map onto the physical space generates a grid associating positions within a coordinate system to visibility values and indications of uncertainty associated with the visibility values.

3. The computer-implemented method of claim 2, wherein the indications of uncertainty associated with the visibility values are at least one of indications of evidence of being well lit, indications of evidence of being not well lit, or indications of uncertainty associated with a determination of being well-lit or not well-lit.

4. The computer-implemented method of claim 1, wherein calculating the intensity threshold for the first data distinguishing well-lit pixels within the first data from not-well-lit pixels within the first data comprises applying an automatic thresholding algorithm to the first data.

5. The computer-implemented method of claim 4, wherein the automatic thresholding algorithm is Otsu's method.

6. The computer-implemented method of claim 1, wherein generating the evidential illumination map for the image is further based at least partly on a standard deviation of values for at least a subset of pixels within the first data.

7. The computer-implemented method of claim 1, wherein converting the first data to greyscale comprises converting the first data to values within the L*a*b color space and generating a greyscale image based on L values within the lab color space.

8. The computer-implemented method of claim 1, wherein generating a transmittance map for the first data comprises generating the transmittance map from at least one of a bright channel for the first data or a dark channel for the first data.

9. The computer-implemented method of claim 1, wherein generating a transmittance map for the first data comprises generating the transmittance map based on passing the first data through a neural network machine learning model.

10. The computer-implemented method of claim 1, wherein the second data is generated based on a lidar scan of the physical space.

11. A computing device comprising:
    a data store storing computer-executable instructions; and
    one or more processors configured to execute the computer-executable instructions, wherein execution of the computer-executable instructions causes the computing device to:
    receive, by the one or more processors, first data corresponding to an image of a physical space captured by a camera;
    calculate, by the one or more processors, an intensity threshold for the first data distinguishing well-lit pixels within the first data from not-well-lit pixels within the first data, wherein calculating the intensity threshold for the first data distinguishing well-lit pixels within the first data from not-well-lit pixels within the first data comprises applying an automatic thresholding algorithm to the first data. and wherein converting the first data to greyscale comprises generating a transmittance map for the first data;
    generate, by the one or more processors, an evidential illumination map for the image based at least partly on a comparison between a value of each pixel in first data to an intensity threshold, wherein the evidential illumination map indicates an uncertainty that one or more pixels of the image depict a well-lit area;
    obtain, by the one or more processors, second data corresponding to a three-dimensional representation of the physical space;
    using the second data, project, by the one or more processors, the evidential illumination map onto the physical space; and
    identify, by the one or more processors, a visibility of one or more positions in the physical space based on projection of the evidential illumination map onto the physical space.

12. The computing device of claim 11, wherein projecting the evidential illumination map onto the physical space generates a grid associating positions within a coordinate system to visibility values and indications of uncertainty associated with the visibility values.

13. One or more non-transitory computer-readable media comprising computer-executable instructions that, when executed by a computing system comprising one or more processors, causes the computing system to:
  receive, by the one or more processors, first data corresponding to an image of a physical space captured by a camera;
  calculate, by the one or more processors, an intensity threshold for the first data distinguishing well-lit pixels within the first data from not-well-lit pixels within the first data, wherein calculating the intensity threshold for the first data distinguishing well-lit pixels within the first data from not-well-lit pixels within the first data comprises applying an automatic thresholding algorithm to the first data, and wherein calculating the intensity threshold for the first data comprises converting the first data to greyscale;
  generate, by the one or more processors, an evidential illumination map for the image based at least partly on a comparison between a value of each pixel in first data to an intensity threshold, wherein the evidential illumination map indicates an uncertainty that one or more pixels of the image depict a well-lit area;
  obtain, by the one or more processors, second data corresponding to a three-dimensional representation of the physical space;
  using the second data, project, by the one or more processors, the evidential illumination map onto the physical space; and
  identify, by the one or more processors, a visibility of one or more positions in the physical space based on projection of the evidential illumination map onto the physical space.

14. The one or more non-transitory computer-readable media of claim 13, wherein projecting the evidential illumination map onto the physical space generates a grid associating positions within a coordinate system to visibility values and indications of uncertainty associated with the visibility values.

* * * * *